United States Patent
De La Chaux et al.

(10) Patent No.: US 11,588,372 B2
(45) Date of Patent: Feb. 21, 2023

(54) ELECTRICAL DRIVE UNIT HAVING A POLE HOUSING AND AN ELECTRONIC HOUSING HAVING A GROUND CONNECTION

(71) Applicant: Robert Bosch GmbH, Stuttgart (DE)

(72) Inventors: Eric De La Chaux, Buehl (DE); Fengmei Cheng, Karlsruhe (DE); Helmut Meier, Renchen (DE); Jan Wilhelm, Hockenheim (DE)

(73) Assignee: Robert Bosch GmbH, Stuttgart (DE)

( * ) Notice: Subject to any disclaimer, the term of this patent is extended or adjusted under 35 U.S.C. 154(b) by 191 days.

(21) Appl. No.: 16/934,780

(22) Filed: Jul. 21, 2020

(65) Prior Publication Data
US 2021/0028667 A1    Jan. 28, 2021

(30) Foreign Application Priority Data
Jul. 22, 2019   (DE) .......................... 102019210819.9

(51) Int. Cl.
*H02K 5/22*       (2006.01)
*H02K 11/40*    (2016.01)

(52) U.S. Cl.
CPC ............. *H02K 5/225* (2013.01); *H02K 11/40* (2016.01)

(58) Field of Classification Search
CPC ............ H02K 5/22; H02K 5/225; H02K 5/24; H02K 11/01; H02K 11/014; H02K 11/0141; H02K 11/30; H02K 11/33; H02K 11/38; H02K 11/40
See application file for complete search history.

(56) References Cited

U.S. PATENT DOCUMENTS

| | | | | |
|---|---|---|---|---|
| 4,384,223 A | * | 5/1983 | Zelt ...................... | H02K 11/024 310/71 |
| 2010/0323552 A1 | * | 12/2010 | Chaumet .............. | H02K 11/026 439/426 |
| 2014/0361650 A1 | * | 12/2014 | Schneider .............. | H02K 11/40 310/71 |

(Continued)

FOREIGN PATENT DOCUMENTS

| | | |
|---|---|---|
| DE | 10 2012 222 683 A1 | 6/2014 |
| DE | 10 2017 207 165 A1 | 12/2018 |
| JP | H07115747 A * | 5/1995 |

*Primary Examiner* — Eric Johnson
(74) *Attorney, Agent, or Firm* — Michael Best & Friedrich LLP

(57) ABSTRACT

An electrical drive unit has a housing having a metal pole housing, which accommodates a stator and a rotor, and a separately produced electronic housing which axially adjoins the pole housing and accommodates an electronic unit. At least one contact element is integrated inside the electronic housing and forms, via at least one ground pin, an electrically conductive connection between the electronic housing and the pole housing to establish a ground connection. An open flange and a cylindrical circumferential wall are formed on the pole housing, against which circumferential wall the at least one ground pin radially bears in a resilient manner, and the at least one ground pin has a side surface facing the circumferential wall, wherein a bearing contour is formed on the side surface and bears against the circumferential wall only in an approximately punctiform manner with respect to an axial direction and/or a circumferential direction.

12 Claims, 4 Drawing Sheets

(56) References Cited

U.S. PATENT DOCUMENTS

2015/0236570 A1* 8/2015 Hayashi ............... H02K 11/33
                                                    310/71
2016/0285340 A1* 9/2016 Hiwa .................... F04D 29/083
2020/0088182 A1* 3/2020 Honda .................. F04C 29/068

* cited by examiner

ELECTRICAL DRIVE UNIT HAVING A POLE HOUSING AND AN ELECTRONIC HOUSING HAVING A GROUND CONNECTION

BACKGROUND

The invention relates to an electrical drive unit having a pole housing and an electronic housing and to a method for producing such a drive unit.

DE 10 2012 222 683 A1 has disclosed an electrical machine having a metal pole pot. A plastic plug component, on which a cover made of electrically conductive material is in turn arranged, is axially arranged on the pole pot. In this case, the cover is braced with the pole pot by means of a plurality of steel spring clamps, with the result that the three components are fixed with respect to one another. In this case, the steel spring clamps, with the pole housing and the metal cover, act as an EMC shield which shields inward and outward radiation of interfering electromagnetic waves. The assembly of such outer metal springs is relatively complicated and intensive in terms of installation space. In addition, there is the risk of these metal springs corroding and their contact resistance being adversely affected as a result. In addition, a shielding plate may be arranged around the plug component and is electrically connected to the cover and/or the pole pot. However, the production and assembly of such a shielding plate is likewise a considerable additional expense.

DE 10 2017 207 165 A1 has disclosed a drive unit in which contact elements are integrated inside an electronic housing in order to connect the electronic housing to the electrical ground of the pole housing. In this case, in the event of strong vibrations and a high thermal load, there is the risk of the spring contacts on the pole housing becoming detached or their contact resistance increasing over the service life and the electronic housing no longer being reliably electrically shielded as a result. The invention described below is intended to rectify this problem.

SUMMARY

In contrast, the electrical drive unit according to the invention has the advantage that, for the reliable ground connection of the printed circuit board and/or the electronic housing to the pole housing, the ground pins have a punctiform bearing contour which, in the event of a relative movement between the ground pin and the pole housing, penetrates or removes a possibly formed oxide layer. As a result of the approximately punctiform pressing at least with respect to the circumferential direction or the axial direction, the oxide layer is removed at the contact point and the contact resistance is therefore reduced. Reliable ground contact between the ground pins and the pole housing is therefore ensured over the entire service life and over wide temperature ranges and in the case of high vibrational loads.

In terms of manufacturing, the punctiform bearing contour can be formed on the ground pin in the form of a keel tip with adjoining keel surfaces. For this purpose, a flat spring tongue can be simply bent by a keel angle in the center, for example. In this case, the keel tip advantageously extends along the axial direction, with the result that the punctiform bearing contact relates only to the circumferential direction. During operation, this keel tip can penetrate and/or remove the oxide surface, which forms again and again during operation, in the contact region in the case of micro-movements with respect to the pole housing wall. Such a keel-shaped bearing contour can therefore be concomitantly formed as a bent and stamped part in the process of producing the contact element without additional expense.

So that the keel tip is not worn away too quickly, the angle of the keel tip is preferably 90° to 170°. With such an obtuse keel angle, the abrasion of the keel tip remains within limits, wherein the resulting oxide particles can nevertheless be transported away sufficiently well in the circumferential direction along the keel surfaces. In one particularly preferred embodiment, the keel angle is greater than 140° in order to also limit the radial extent of the ground pin in the axial region of the circumferential wall.

The keel tip with its two symmetrical side surfaces is a type of obtuse wedge, the tip of which radially buries again and again into the circumferential wall and pushes interfering oxide particles laterally away from the contact surface by the slight relative movement.

In order to be able to axially insert the ground pin, together with the electronic housing, more easily into the pole pot during assembly, an insertion chamfer is formed on the free end of the ground pin so that the ground pin is axially inserted into the pole housing radially within the circumferential wall.

The formation of the keel tip on the ground pin and its radial pressing against the pole housing continuously removes an oxide surface forming both on the circumferential wall of the pole housing and on the ground pin over the entire service life of the electrical drive unit in order to establish good electrical contact with a low contact resistance.

The pole housing may be produced in a particularly cost-effective manner from sheet steel, in particular by means of deep drawing. The ground pin can be produced, together with the contact element, as an insert part in the electronic housing without additional expense. In order to ensure a continuous radial pressing force of the ground pin against the circumferential wall over the service life, the ground pin is preferably produced from a spring metal sheet, in particular as a bent and stamped part.

According to a further embodiment, the punctiform bearing contour is curved or spherical on the side surface of the ground pin, with the result that this bearing contour bears against the circumferential wall only in a punctiform manner approximately at least with respect to the axial direction.

It is particularly favorable if the punctiform bearing contour bears against the circumferential wall in an approximately punctiform manner both in the circumferential direction and in the axial direction since the ground pin then presses onto the circumferential wall at the concentrated tip with an increased surface pressure. This increased surface pressure results in greater pressing of the bearing contour against the circumferential wall, thus establishing better electrical contact. Such a bearing contour which is approximately punctiform with respect to both directions can be favorably implemented with a spherical shaped portion which ideally bears against the circumferential wall of the pole housing only at a one-dimensional point.

Such a spherical shaped portion can be produced, for example, by virtue of the ground pin having an additional coating at least on its side surface toward the circumferential wall, which coating is spherical or drop-shaped or curved in order to ideally bear against the circumferential wall in an approximately punctiform manner. This additional coating may be a material which has a particular hardness and/or particularly good conductivity, for example.

In a particularly cost-effective manner, the ground pin is in the form of a one-piece part of the contact element, the free end of which bears against the circumferential wall of the pole housing. Alternatively, a separately produced ground pin can also be fastened to the end of the contact element, the geometry of which ground pin is optimized for reliable bearing against the circumferential wall. As a result, for example, the electronic housing part, with the contact element, can be easily removed from an injection mold and the ground pin can have a more complex structure or an optimized material.

In order to optimize the radial pressing force of the punctiform bearing contour on the circumferential wall, the bearing contour may be advantageously connected to the contact element via a formed spring web. Such a spring web may have a smaller cross section, for example, in order to increase its elasticity. It is also possible for the spring web to have an additional spring travel which can compensate for tolerances which arise as a result of temperature differences and signs of wear.

The ground pins are connected to the contact elements and are preferably formed in one piece with the latter. The contact elements are then electrically connected to the printed circuit board and/or to the second electronic housing part in order to form an electromagnetic shield. At least one electronic circuit board for controlling the drive unit is arranged inside the electronic housing. In order to suppress the interference from this electronic circuit board, it is connected to at least one ground pin via at least one contact element. In addition, a metal cover of the electronic housing may be electrically connected to the printed circuit board and/or the ground pin via further contact elements, for example. With the insertion of the printed circuit board, the latter is directly electrically contact-connected to the at least one contact element, with the result that the electrical interference from the printed circuit board is suppressed. In addition, with the placement of a metal cover onto the axially open electronic housing, electrical contact-connection to an additional contact element or to the printed circuit board can be optionally implemented. As a result, the entire housing can be very easily formed as an EMC shield of the electrical drive unit without additional assembly processes. This ground contact-connection of the electronic circuit board both to the pole housing and to the metal housing cover practically creates a Faraday cage for the EMC shielding of the electronic circuit board. The contact elements may preferably be in the form of insert parts which are inserted into the mold when injection-molding the first plastic housing part in order to then be encapsulated with the plastic of the housing wall at least in the fastening regions. As a result, the contact elements are fixed in one work step with the production of the first housing part, wherein the ground pins are preferably formed in one part with the free ends of the contact elements. Alternatively, separately produced ground pins can be connected to the contact elements by means of a welded or soldered connection or by means of hot stacking or by means of an insulation-displacement connection and, in particular, are carried out in one work step with the contact-connection of the coil wire ends to form the corresponding conductor elements of the interconnect plate.

In addition to the second radial step in which the ground pins are inserted, the pole housing has, in one preferred embodiment, a first radial step which has a greater diameter than the second radial step. A circular axial extension of the electronic housing into the pole housing engages in this first radial step in order to tightly close the pole housing to the outside. The ring seal between the electronic housing and the pole housing is preferably arranged in this first radial step.

A bearing seat for bearing the rotor is formed, in a manner which is favorable in terms of manufacturing, in that housing wall of the electronic housing which is arranged transversely with respect to the rotor axis. The housing wall is preferably produced as a plastic bearing shield by means of injection-molding, wherein a ball bearing is inserted into the bearing seat, for example, and accommodates the rotor shaft. In this case, the rotor shaft preferably axially projects, through the rotor bearing, into the interior of the electronic housing. The wire ends of the stator coils are guided through axial holes in the housing wall of the electronic housing in order to be contact-connected to the interconnect plate. In this case, both the passage openings for the ground pins and the holes for the coil wire ends are radially inside a sealing ring which is arranged between the pole housing and the electronic housing.

If the second housing part is in the form of a heat sink for the electrical drive unit, electronic components can be arranged inside the first housing part directly in thermal contact with the inner side of the housing cover. In this case, the contact elements may be simultaneously also used as heat conductors. In this case, the housing cover is cast from aluminum, for example, or is deep-drawn as a metal sheet. The heat produced by the electronics can be quickly dissipated via the cooling ribs formed on the outer side. The first plastic electronic housing part is arranged in this case between the housing cover and the metal pole housing according to a sandwich design. In this case, its connection plug preferably extends in the radial direction away from the rotor shaft. As a result of the electronic unit being axially arranged directly above the electric motor, a signal transmitter which interacts with a corresponding sensor of the electronic unit can be advantageously arranged at one end of the rotor shaft. This makes it possible to capture the rotor position of the electronic unit, for example in order to control the electrical commutation of the electric motor or to determine the rotational speed of the rotor shaft or the position of a part driven by the rotor shaft. It is particularly favorable if the signal transmitter emits signals in the axial direction which can be captured by a sensor element which is axially directly opposite. In this case, it is particularly advantageous if the sensor element is directly arranged on the printed circuit board, in which case this sensor element can capture the orientation of a magnetic field, for example. As a result of the electronic housing being arranged on the axially open side of the pole pot, a passage opening can be formed on the opposite side of the pole pot in the base of the pole pot, through which the rotor shaft projects to the outside. As a result, an output drive element can be formed or arranged on the second free axial end of the rotor shaft, which output drive element adjusts a movable part in the motor vehicle or drives a pump or fan, for example.

As a result of the method according to the invention for producing and operating the electrical drive unit, reliable ground contact-connection between the pole housing and the electronic housing can be ensured over the entire service life. In this case, the punctiform bearing contour of the ground pin is already pressed in a radially resilient manner into the circumferential wall of the pole housing when axially mounting the first electronic housing part on the open pole housing. In the case of a micro-movement between the punctiform bearing contour and the circumferential wall of the pole housing, the interfering oxide layer in the contact region is removed again and again over the entire service life by means of the wedge effect. In this case, the keel tip or, in particular, the spherical approximately punctiform bearing contour can radially penetrate the resulting oxide layer again and again by means of the spring force of the ground pin and can push the interfering oxide particles to the side by means of the micro-movement.

BRIEF DESCRIPTION OF THE DRAWINGS

Further features of the invention emerge from the further embodiments in the description and the drawing, as described in the following exemplary embodiments of the invention. In the drawing.

DETAILED DESCRIPTION

Figure 1:
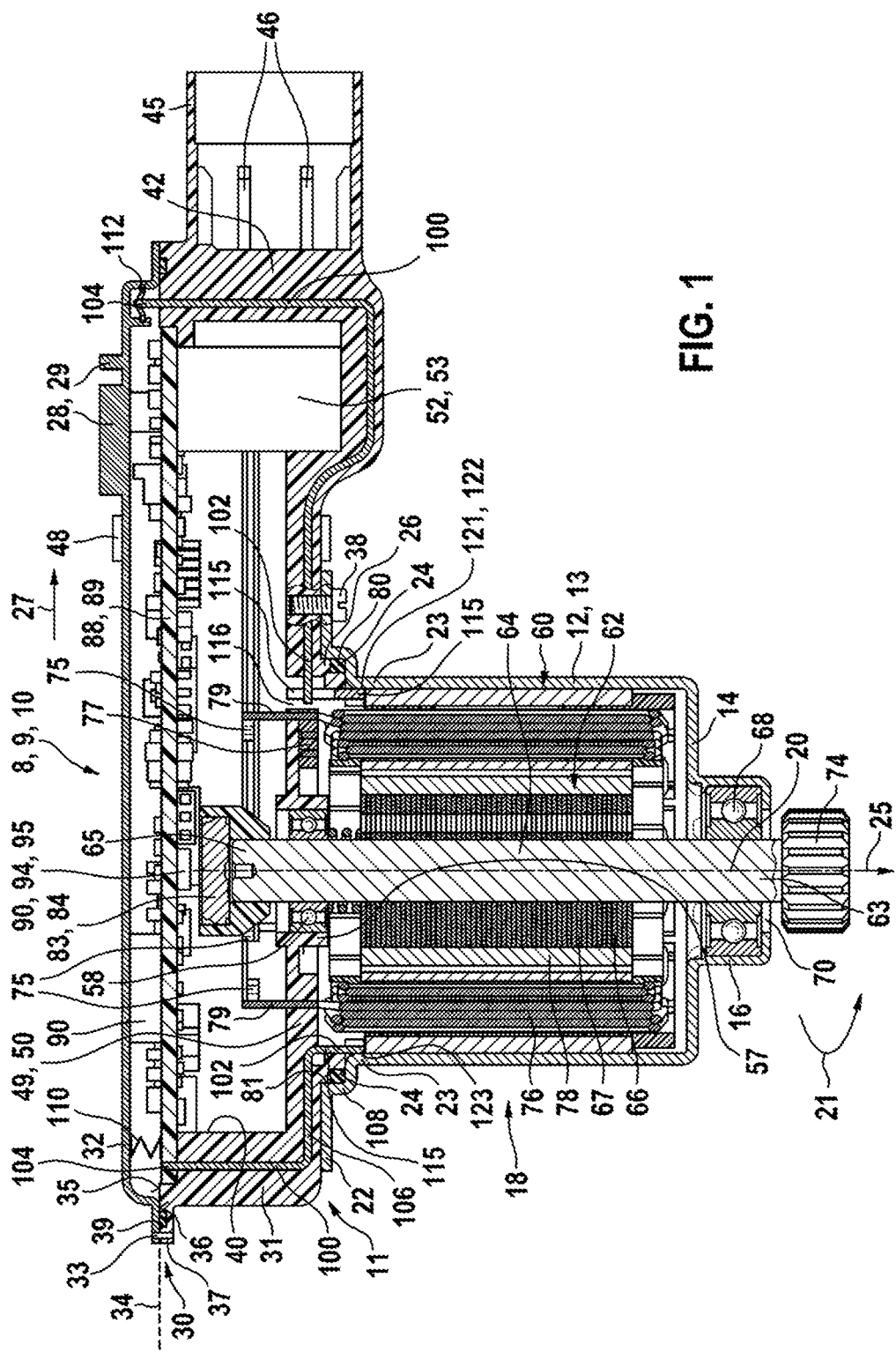
FIG. 1 shows a first embodiment of an electrical drive unit according to the invention.

FIG. 1 illustrates an electrical drive unit 10 which is in the form of an electric motor 9 having a housing 11. A stator 60 which has a plurality of stator poles and interacts with a rotor 62 arranged on a rotor axis 20 is arranged in a pole housing 12 of the housing 11. The pole housing 12 is a metal motor housing in which the stator poles are accommodated. The stator poles each have, for example, a T-shaped lamella main body for accommodating electrical coils 76, wherein the magnetic return flux runs in the circumferential direction 21 via the lamella main bodies. Therefore, the magnetic return flux need not run via the pole housing 12. The pole housing is preferably produced as a steel deep-drawn part. The rotor 62 has a rotor shaft 64 on which a rotor body 66 preferably composed of individual sheet metal lamellae 67 is arranged. In the exemplary embodiment, the rotor shaft 64 is mounted on the base 14 of the pole housing 12 by means of a first bearing 68. For this purpose, the pole housing 12 has an axial elongation 16 which is in the form of a bearing seat for the first bearing 68. The pole housing 12 is in the form of a pole pot 13 which is produced as a deep-drawn part, for example. A second axial end 63 of the rotor shaft 64 projects from the pole housing 12 through an aperture 70 in the latter in order to transmit a torque of the electric motor 9 to a transmission (not illustrated) or pump or fan. In this case, the aperture 70 is formed on the axial elongation 16, in which case an output drive element 74 is arranged on the rotor shaft 64 outside the pole housing 12 or is formed on the rotor shaft 64. The pole housing 12 consists of metal and is optionally in the form of a magnetic return flux for the electromagnetic poles of the stator 60.

If the electric motor 9 is in the form of an EC motor 8, the electrical coils 76 in the stator 60 in the radial outer region of the pole housing 12 are arranged on stator teeth which generate a magnetic field in order to rotate permanent magnets 78 arranged in the rotor 62. In this exemplary embodiment, the pole housing 12 is in the form of an approximately cylindrical pole pot 13 which is axially open. A bearing shield 50 in which a second bearing 58 of the rotor shaft 64 is fastened is arranged at the axial opening 80 of the pole housing 12. The bearing shield 50 is, for example, part of a first axial housing part 31 of a plastic electronic housing 30. The first electronic housing part 31 is inserted, with the bearing shield 50, at the open edge 81 of the pole housing 12. A first free end 65 of the rotor shaft 64, which is opposite the output drive element 74 and on which a signal transmitter 83 for capturing the rotor position is arranged, projects through the second bearing 58. An interconnect apparatus 77, which connects the individual coils 76 to one another and forms electrical phase connections 75 in the electronic housing 30, is arranged in the first housing part 31. The pole housing 12 with the rotor 62 completely mounted therein is a preassembled structural unit 18 to which the first axial housing component 31 can be axially flanged. For this purpose, a flange 22 is formed on the open edge 81 of the pole housing 12, against which flange the electronic housing 30 axially bears in the exemplary embodiment, which electronic housing is composed of the first axial housing part 31 and a second axial housing part 32. The pole housing 12 and the electronic housing 30 together form the housing 11 of the drive unit 10.

The first axial housing part 31 bears axially against the pole housing 12. For this purpose, the first axial housing part 31 has a cylindrical extension 26 which axially engages in the pole housing 12. In this case, a first radial step 108 is formed on the open edge 81 of the pole housing 12, which step is followed in the axial direction 25 by a cylindrical circumferential wall 23, against which a ground pin 115 bears. A sealing ring 24 which is used to seal the pole housing 12 with respect to the electronic housing 30 is arranged between the axial cylindrical extension 26 and the first radial step 108. The open edge 81 and the cylindrical axial extension 26 are approximately circular, in which case the base area of the first axial housing part 31 is approximately rectangular, for example, in a plan view from above according to FIG. 1, and radially projects beyond the pole housing 12. The first axial housing part 31 has, on the side axially facing away from the pole housing 12, an assembly opening 40 which is completely closed by the second axial housing part 32. This means that the electronic housing 30 has a separating plane 34 transverse to the rotor axis 20, on which the two separately produced axial housing parts 31, 32 are connected to one another. According to the embodiment in FIG. 1, the first axial housing part 31 has for this purpose an axial bearing surface 35 axially opposite the axial cylindrical extension 26, which bearing surface bears against a mating surface 36 of the second housing part 32. A circumferential sealing element 39 is preferably arranged between the bearing surface 35 and the mating surface 36. The second housing part 32 is connected to the first housing part 31 by means of clamping brackets 48, for example. In order to center the second housing part 32 with respect to the first housing part 31, centering pins 33 are arranged and engage in corresponding centering receptacles 37. The first housing part 31 is preferably connected to the flange 22 of the pole housing 12 by means of screws 38. The assembly opening 40 in the separating plane 34 is approximately rectangular. The bearing surface 35 and the mating surface 36 surround the assembly opening 40 and are therefore likewise approximately rectangular. The first housing part 31 is produced from plastic and, in contrast, the second housing part 32 is produced from aluminum or sheet steel in the form of a cover for better heat dissipation. In this case, heat conducting elements 28 which are in the form of cooling ribs 29 or cooling nubs, for example, are formed on the outer wall of the second housing part 32.

A printed circuit board 88 which extends transversely to the axial direction 25 is arranged in the electronic housing 30 as an electronic unit 89. The contact elements 100 are arranged in the first housing part 31 and form a conductive connection between the pole housing 12 and the printed circuit board 88 and/or the metal second housing part 32. For this purpose, in the exemplary embodiment, the contact elements 100 are in the form of insert parts which are encapsulated by the first electronic housing part 31 during injection-molding of the latter. The contact elements 100 have, at a first free end 102, the ground pins 115 which are electrically connected to the pole housing 12. The ground pins 115 may be formed in one piece with the contact elements 100 (see left-hand side in FIG. 1) or as separate components which are connected to the contact element 100 by means of a clamping connection or an insulation-displacement or welded connection (see right-hand side in FIG. 1). The contact elements 100 are in the form of stamped and bent parts which have a fastening region 106 in which the contact element 100 is preferably encapsulated with the plastic of the electronic housing 30. The fastening region 106 preferably extends in a plane transverse to the rotor shaft 64. The first free end 102 projects from the housing wall 49 of the electronic housing part 31 in order to directly contact-connect the pole housing as a ground pin 115. Alternatively, the free end 102 is then connected to the separately produced ground pin 115, for example in the region of a passage opening 116 in the housing wall 49 of the first electronic housing part 31. The ground pins 115 radially bear against the cylindrical circumferential wall 23 of the pole housing.

For better contact-connection, the ground pins 115 have a keel tip 123 which runs in the axial direction 25 and, on account of the resilient design of the ground pins 115, is pressed into the surface 43 of the circumferential wall 23 of the pole housing 12 in the radial direction 27. In this case, the keel tip 123 acts like the tip of a wedge which buries into the surface 43 with an obtuse angle. The keel tip 123 is an approximately punctiform bearing contour 122 with respect to the circumferential direction 21, which bearing contour ensures that the contact-connection of the ground pins 115 forms a reliable electrical connection between the pole housing 12 and the electronic housing 30 even in the case of a vibrational load and great temperature fluctuations of the electrical drive 10.

In a first variant, a second end 104 of the contact element 100 is directly electrically contact-connected to the printed circuit board 88, for example by means of soldering, pressing or an insulation-displacement connection. For this purpose, the second end 104 projects from the plastic wall of the first housing part 31 and projects into a hole in the printed circuit board 88, for example. At least one contact spring 110, which forms a ground connection to the inside of the second housing part 32, is electrically contact-connected on the printed circuit board 88. As a result, the ground connection between the pole housing 12 and the second housing part 32 is formed completely inside the housing 11 via the ground pin 115, the contact element 100, the printed circuit board 88 and the contact spring 110. Precisely three contact elements 100 of this type are preferably inserted inside the first housing part 31 and are connected to the printed circuit board 88 and/or to the electronic housing 30 at three different locations.

The right-hand side of FIG. 1 illustrates a further variant of a contact element 100 which electrically connects the pole housing 12 to the second housing part 32 of the electronic housing 30 directly, in particular without contact-connection of the printed circuit board 88. In this case, the contact element 100 is again contact-connected at the first end 102 by means of the ground pin 115 on the pole housing 12 and runs inside the plastic wall of the first housing part 31 directly to the inside of the second housing part 32. The second end 104 again emerges from the plastic wall of the first housing part 31 and directly contact-connects the second housing part 32 during the axial assembly of the latter. In this case, the second end 104 can resiliently bear directly against the inner wall of the second housing part 32 or can be contact-connected by means of a speed nut element 112.

In order to assemble the electrical drive unit 10, the prefabricated motor structural unit 18 is first of all connected to the first axial housing part 31, preferably screwed to the latter. During the axial assembly of the first housing part 31, the ground pins 115 are simultaneously pressed against the circumferential wall 23 of the pole housing 12 in order to electrically contact-connect the latter. In this state, the first housing part 31 can be axially equipped with the printed circuit board 88 and optionally with further components via the assembly opening 40. Before the second axial housing part 32 is axially placed onto the assembly opening 40 of the first housing part 31, the printed circuit board 88 is fastened on the inside of the first housing part 31. In this case, the second ends 104 of the contact elements 100 can also be electrically connected, in particular soldered, to the printed circuit board 88. The second housing part 32, before it is placed onto the first housing part 31, can likewise be equipped with corresponding components. In the exemplary embodiment, a connection plug 42 for electrically contact-connecting the drive unit 10 is formed in one piece on the first housing part 31. The connection plug 42 has a plug collar 45 in which the individual pins 46 for the power supply and the sensor signals are arranged. In this case, the plug collar 45 projects radially outward from the first housing part 31. A first interference suppression element 52 which has an interference suppression capacitor 53, for example, is arranged inside the electronic housing 30 on the printed circuit board 88. When installing the printed circuit board 88 in the first housing part 31, an electrical connection of the phase connections 75 of the coils 76 and of the pins 46 to the printed circuit board 88 is established. A first contact element 100 is preferably arranged in the immediate vicinity of the connection plug 42 and a second contact element 100 is arranged in the immediate vicinity of the interference suppression element 52. A sensor element 94 which can evaluate the signals from the signal transmitter 83 is arranged on the printed circuit board 88 on the side facing the pole housing 12. For example, the signal transmitter 83 is in the form of a sensor magnet 84, the axial magnetic field of which can be detected by a sensor element 94 in the form of a magnetic sensor 95. This may be in the form of a GMR or GMX sensor, for example, which can directly capture the rotational position of the sensor magnet 84. The electronic unit 89 can evaluate this signal in order to hereby control the electronic commutation of the EC motor 8, for example. In addition, the rotational position signal can also be used for the movement of the output drive element 74 for different applications.

Figure 2:
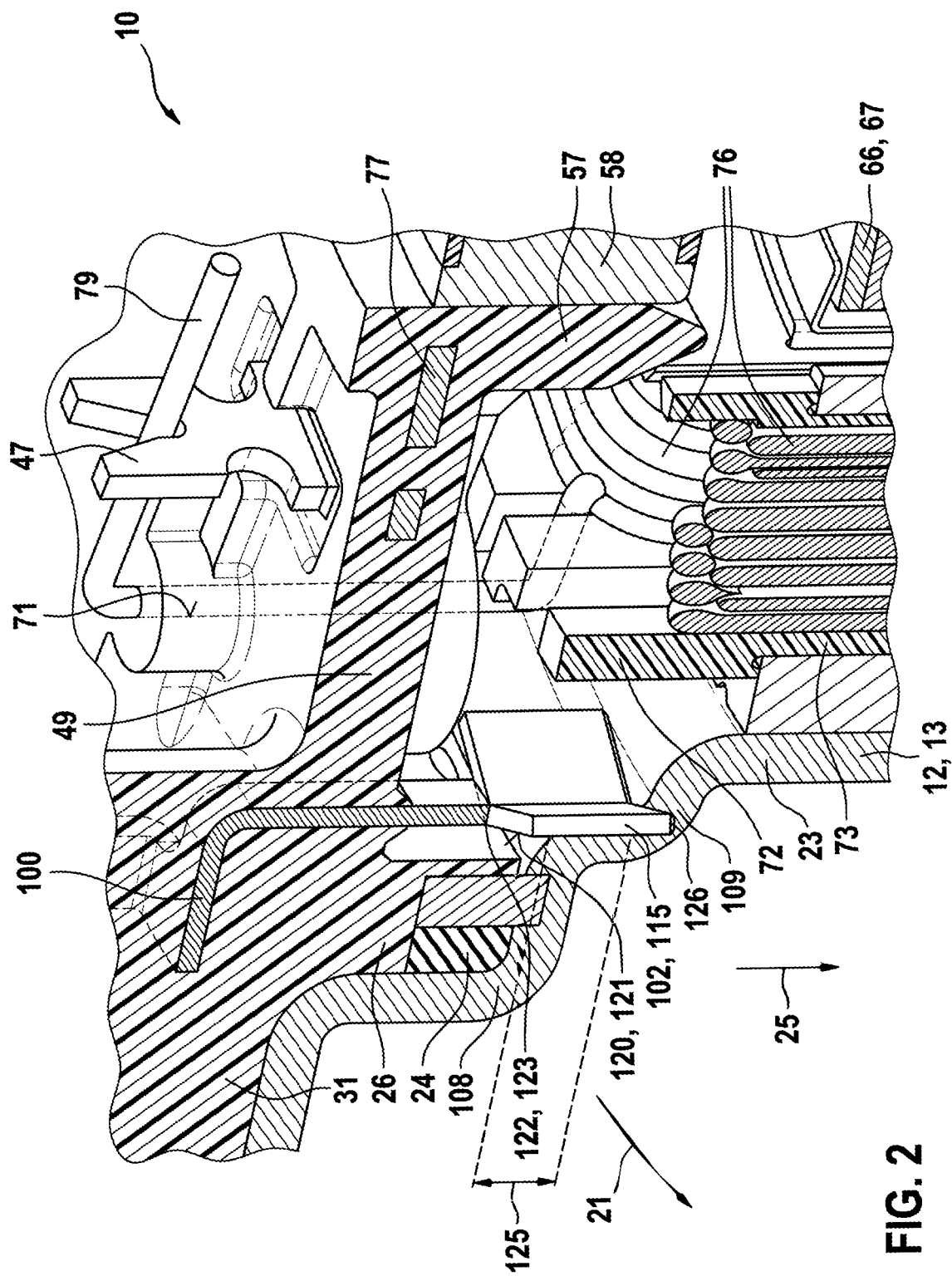
FIG. 2 shows a second exemplary embodiment of an electrical drive unit according to the invention.

FIG. 2 shows a section through a further exemplary embodiment in which the electronic housing 30 is already electrically connected to the pole housing 12. The ground pins 115 engage in a second radial step 109 of the pole housing 12. The axial cylindrical extension 26 of the first electronic housing part 31 engages in the first radial step 108. The seal 24 between the pole housing 12 and the cylindrical extension 26 is schematically illustrated, in which case the seal 24 surrounds all ground pins 115. An accommodating space for the ground pins 115 is formed between the circumferential wall 23 on the second step 109 and an axial elongation 72 of an insulating mask 73 for the coils 76. The ground pin 115 is formed here in one piece with the contact element 100 as its first free end 102. The bearing contour 122 is likewise formed here with a keel tip 123 which extends over the entire axial overlapping region 125 between the ground pin 115 and the opposite circumferential wall 23. In this case, this corresponds to the axial height of the second step 109 of the pole housing 12. Only the keel tip 123 of the ground pin 115 bears against the circumferential wall, in which case bent keel surfaces 120 each protrude from the circumferential wall 23 in the circumferential direction 21 starting from the punctiform bearing contour 122. In this embodiment, the extent of the ground pin 115, for example in the axial region of the bearing contour 122, is broader in the circumferential direction 21 than a region of the ground pin 115 axially above the bearing contour 122, in particular broader than the region in which the contact element 100 as a ground pin 115 emerges from the housing wall 49 of the electronic housing part 31. The contact element 100 is injected or clamped into the housing part 31 here and the second free end 104 of the contact element axially projects upward from the housing wall 49. With the axial insertion of the printed circuit board 88, the second end 104 engages, for example, in a contact opening of the printed circuit board 88. FIG. 2 also illustrates the electrical contact-connection of the coil wire ends 79 which are axially guided through corresponding holes 71 in the housing wall 49 when assembling the first housing part 31. The coil wire ends 79 are then bent around along the housing wall 49, for example, and are clamped in fork-shaped contact tabs 47 of the interconnect apparatus 77.

Figure 3:
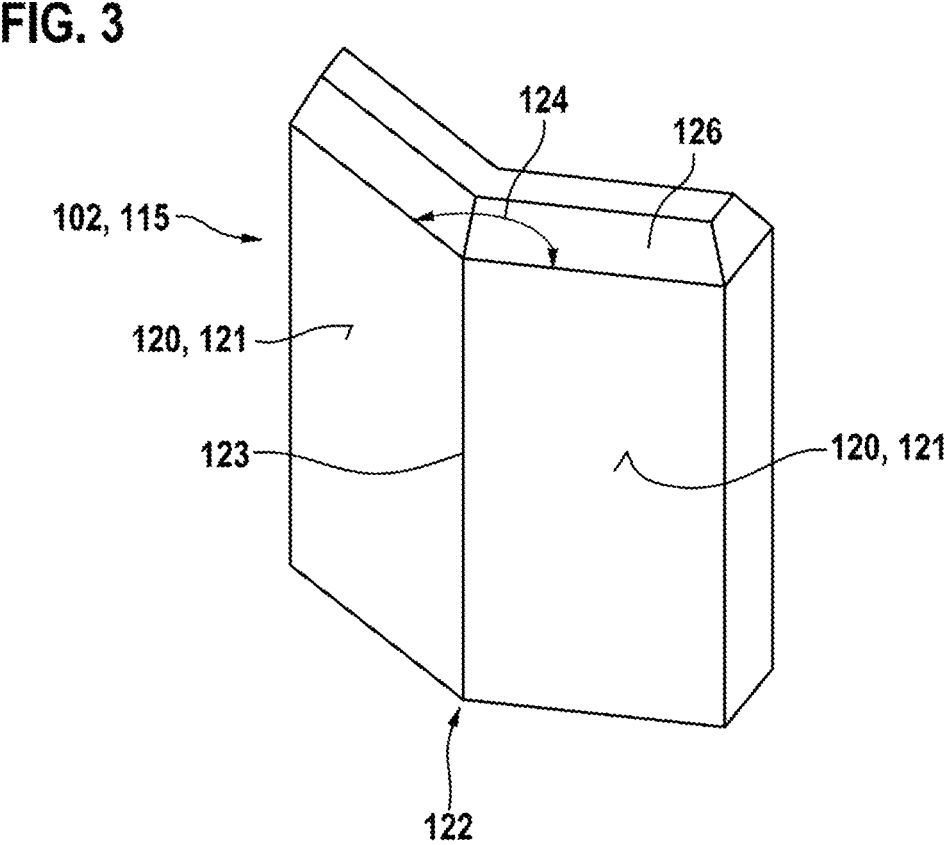
FIGS. 3 and 4 show detailed illustrations of the ground pin according to FIG. 1.
Figure 4:
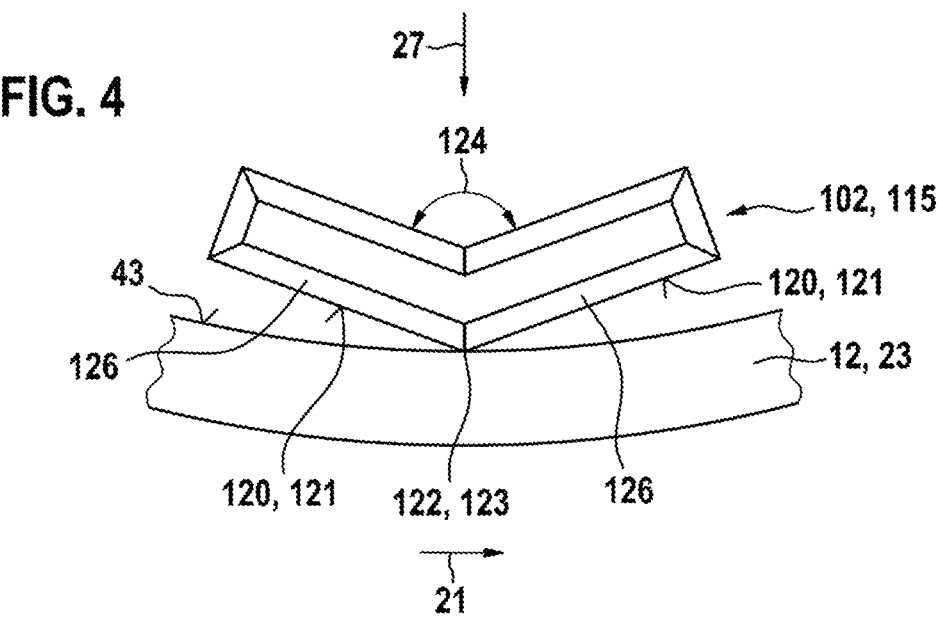

FIG. 3 illustrates an axially lower end of a ground pin 115, as may be formed in FIG. 1, for example. The axially running keel tip 123 subdivides the side surface 121, which is opposite the circumferential wall 23, into two symmetrical keel surfaces 120. These keel surfaces 120 are arranged at a keel angle 124 with respect to one another which is in the form of an obtuse angle, preferably in the range of 90° to 170°. The keel tip 123 forms a punctiform bearing contour 122 with respect to the circumferential direction 21, as schematically illustrated in FIG. 4. The ground pin 115 is in the form of a spring tab which exerts a prestressing force on the circumferential wall 23 in the radial direction 27. Insertion phases 126 which facilitate the axial insertion of the ground pins 115 along the circumferential wall 23 are formed on the axial end face of the ground pin 115 at least on the radially outer side surface 121.

Figure 5:
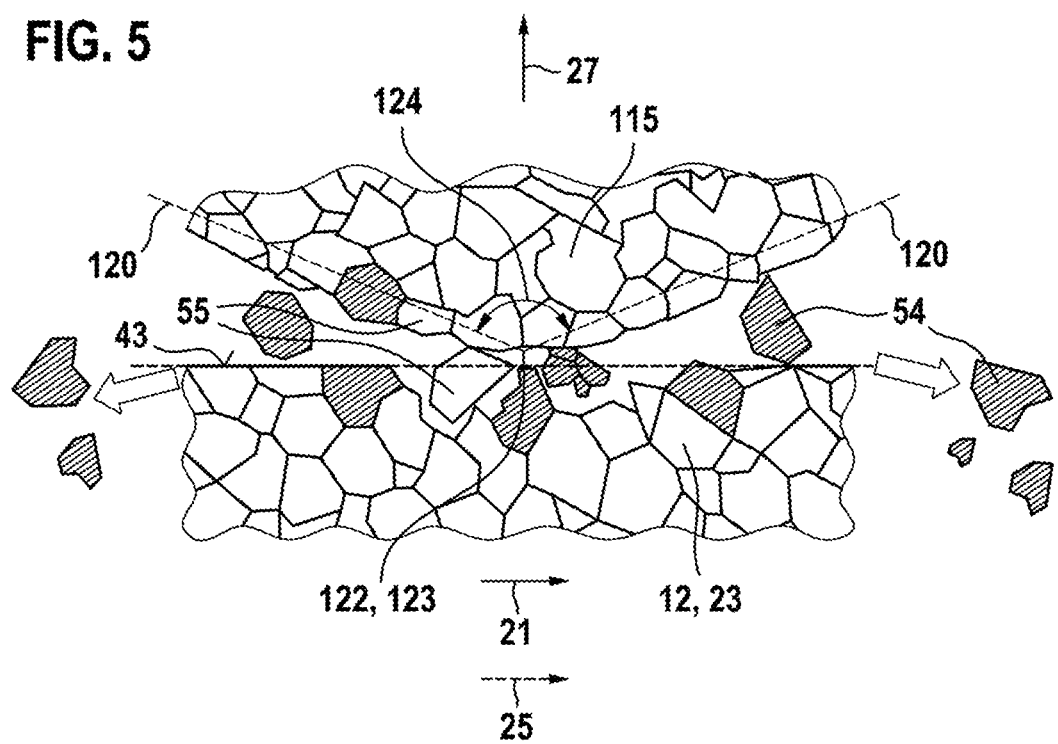
FIG. 5 shows a microscopic illustration of the operating principle of the ground pin according to the invention.

FIG. 4 illustrates a plan view of the ground pin 115 from FIG. 3 from below. As a result of the formation of the keel angle 124, the two keel surfaces 120 do not bear against the circumferential wall 23, but rather only the keel tip 123. As a result of the wedge effect of the keel tip 123, the latter buries again and again into the surface 43 of the pole housing 12, as a result of which oxide particles which hinder electrical contact are eliminated. This principle is schematically illustrated in FIG. 5 at a microscopic level.

Both the surface 43 of the circumferential surface 23 and the surface of the side surfaces 121 of the ground pin 115 as well as abraded particles which are still adhering undergo passive oxidation over the operating time which impairs electrical contact. The oxidation particles 54 are illustrated using hatching in FIG. 5. If the bearing contour of the ground pin 115 were in the form of a flat, smooth surface, as in the prior art, the oxidation particles 54 would collect in the intermediate space between the flat bearing contour and the curved circumferential surface 23. The punctiform bearing contour 122 according to the invention forms a type of wedge which buries into the circumferential wall 23. As a result of the relative movement of the ground pin 115 with respect to the circumferential wall 23, the punctiform bearing contact 122 can penetrate the oxide layer again and again and can laterally push the oxide particles 54 away by means of the wedge shape. As a result, contact is continuously created between non-oxidized metal particles 55 which are illustrated without hatching in FIG. 5. In this case, the keel surfaces 120 act like a snowplow which laterally pushes the oxide particles 54 to the side. The basic diagram in FIG. 5 can correspond, for example, to a section A-A (in FIG. 6) transverse to the axial direction 25, as in FIG. 4, in which the oxide particles 54 are pushed to the side in the circumferential direction 21. However, the diagram may also correspond to a section B-B (in FIG. 6) parallel to the axial direction 25 in the case of a spherical bearing contour in FIG. 6. In this case, the oxide particles 54 are then accordingly also moved away to both sides in the axial direction 25.

Figure 6:
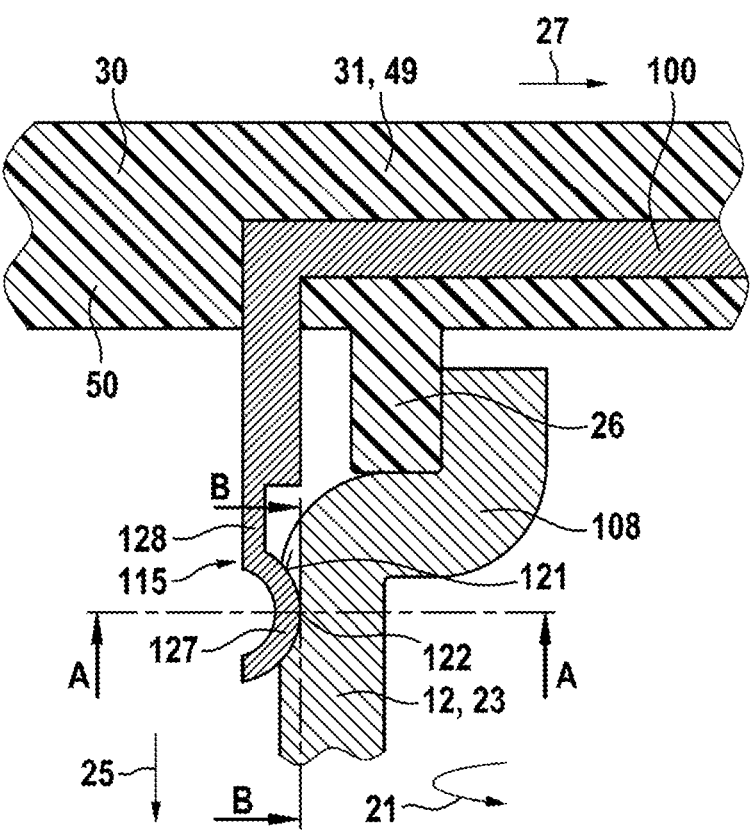
FIG. 6 shows a further exemplary embodiment of an electrical drive unit according to the invention.

In FIG. 6, the bearing contour 122 is approximately punctiform not only with respect to the circumferential direction 21 but also with respect to the axial direction 25. For this purpose, a spherical shaped portion 127 is formed on the side surface 121 of the ground pin 115 and, depending on its radius of curvature, bears against the circumferential wall 23, ideally in a punctiform manner, to a greater or lesser extent. In FIG. 6, the spherical shaped portion has already buried relatively deep into the circumferential wall, as may be the case after a relatively long operating time, in particular. In this exemplary embodiment, the punctiform bearing contour 122 is connected to the ground pin 115 via a spring web 128. This spring web 128 here has a smaller material cross section than in the region in which the contact element 100 emerges as a ground contact 115 from the housing wall 49. In an alternative which is not illustrated, the spring web 128 may also be in the form of a bent region which provides an additional elastic spring travel.

In a further variant which is not illustrated, the spherical shaped portion 127 can also be in the form of an additional coating on the side surface 121 of the ground pin 115. This coating can differ from a spherical shaped portion and can have a curved surface with an approximately punctiform bearing contour 122. The ground pin 115 is again formed in one piece here with the contact element 100 as an insert part of the electronic housing part 31. The cylindrical axial extension 26 of the electronic housing part 31 is inserted into the first step 108 of the pole housing 12.

It should be noted that, with respect to the exemplary embodiments shown in the figures and the description, various possible ways of combining the individual features with one another are possible. The embodiment of the two housing parts 31, 32 can also differ from a rectangular shape and may likewise be round or oval, for example, like the pole housing 12. The electronic housing 30 may have a multi-part design, in particular with a metal cover. Depending on the embodiment of the drive unit 10, the electronic housing 30 may have different electronic functional groups such as the sensor system 94, 83, the interference suppression elements 52, 53 and the EC motor control 90. The number and specific shape of the ground pins 115 and of the contact elements 100 can be adapted to the respective application. The keel angle 124 of the ground pins 115 can be adapted to the material properties and the external environmental conditions, as can the elastic connection of the punctiform bearing contour 122 to the ground pin 115. The punctiform bearing contour 122 may be restricted to the circumferential direction 21 or to the axial direction 25 or may be simultaneously formed with respect to both directions 21, 25. The inventive drive unit 10 is particularly suitable as an embodiment of an EC motor 8 for adjusting movable components or for rotational drives in a motor vehicle. In this case, such an electric motor 9 according to the invention can be used in a particularly favorable manner outside, for example in the engine compartment, where it is exposed to extreme weather conditions and vibrations.

What is claimed is:

1. An electrical drive unit (10) having a housing (11) having a metal pole housing (12), which accommodates a stator (60) and a rotor (20), and a separately produced electronic housing (30) which axially adjoins the pole housing and accommodates an electronic unit (89), wherein at least one contact element (100) is integrated inside the electronic housing (30) and forms, via at least one ground pin (115), an electrically conductive connection between the electronic housing (30) and the pole housing (12) in order to establish a ground connection, wherein an open flange (22) and a circumferential cylindrical circumferential wall (23) are formed on the pole housing (12), against which circumferential wall the at least one ground pin (115) radially bears in a resilient manner from the inside, and the at least one ground pin (115) has a side surface (121) facing the circumferential wall (23), characterized in that a bearing contour (122) is formed on the side surface (121) and bears against the circumferential wall (23) only in an approximately punctiform manner with respect to a circumferential direction (21), wherein the bearing contour (122) is in the form of a keel, wherein a keel tip (123) forms the approximately punctiform bearing contact with respect to the circumferential direction (21), the keel tip (123) being an intersection between two planar sections of the bearing contour (122), and the keel tip (123) extends in the axial direction (25), wherein the keel tip (123) extends over an entire axial overlapping region (125) of the ground pin (115) with the circumferential wall (23), and wherein an angle (124) of the keel tip (123) between the two planar sections is approximately 130° to 160°.

2. The electrical drive unit (10) according to claim 1, characterized in that the keel tip (123) subdivides the side surface (121), symmetrically with respect to the circumferential direction (21), into two flat keel surfaces (120) which are bent by the keel angle (124) with respect to one another.

3. The electrical drive unit (10) according to claim 1, characterized in that an insertion phase (126) is formed on a free axial end of the ground pin (115) and slides along the inside of the circumferential wall (23) during the insertion of the ground pin (115) into the pole housing (12) in the axial direction (25).

4. The electrical drive unit (10) according to claim 1, characterized in that, in the case of a relative movement between the ground pin (115) and the circumferential wall (23), the keel tip (123) buries into the surface (43) of the circumferential wall (23) and in the process penetrates a formed oxide layer.

5. The electrical drive unit (10) according to claim 1, characterized in that the circumferential wall (23) of the pole housing (12) is produced from a steel deep-drawn part, and the ground pin (115) is produced as a stamped and bent part from metal spring material.

6. The electrical drive unit (10) according to claim 1, characterized in that the bearing contour (122) includes a coating of the side surface (121).

7. The electrical drive unit (10) according to claim 6, characterized in that the coating is metal and is applied after encapsulating the contact element (100) with the electronic housing (30).

8. The electrical drive unit (10) according to claim 1, characterized in that the ground pin (115) as a separately produced component is connected to a free axial end of the contact element (100), or in that the ground pin (115) is formed in one piece with the contact element (100) as its free axial end (102), wherein the contact element (100) is encapsulated by plastic of the electronic housing (30).

9. The electrical drive unit (10) according to claim 8, characterized in that the contact element is a stamped and bent part.

10. The electrical drive unit (10) according to claim 1, characterized in that a printed circuit board (88) is arranged in the electronic housing (30) as an electronic unit (89), and the at least one contact element (100) connects the printed circuit board (88) and/or the electronic housing (30) to the pole housing (12) in a conductive manner, and the at least one contact element (100) is contact-connected to the printed circuit board (88) and/or the electronic housing (30) by soldering or welding or bonding or by a press-fit connection or a spring contact or an insulation-displacement connection.

11. The electrical drive unit (10) according to claim 1, characterized in that a housing wall (49) of the electronic housing (30) transverse to the axial direction (25) is separated from an open side (80) of the pole housing (12), and the at least one ground pin (115) axially projects from the housing wall (49) into the pole housing (12) radially inside a ring seal (24) of the pole housing flange (22), and a first radial step (108) is formed on the open flange (22) of the pole housing (12), in which step a cylindrical extension (26) of the electronic housing (30) axially into the pole housing (12) engages, and a bearing receptacle (57) is formed on that housing wall (49) of the electronic housing (30) which is in the form of a bearing shield (50), and a free end (65) of the rotor shaft (64) axially projects into the electronic housing (30) through the bearing receptacle.

12. A method for producing an electrical drive unit (10) according to claim 1, characterized in that, with the insertion of an electronic housing part (31) of the electronic housing (30) into the cylindrical circumferential wall (23) of the pole housing (12), the at least one ground pin (115) is radially pressed outward against the circumferential inner wall (23) of the pole housing (12), wherein the punctiform bearing contour (122) of the ground pin (115) buries again and again into the surface (43) of the circumferential wall (23) over the service life of the electrical drive unit (10) in the case of a relative movement between the ground pin (115) and the circumferential wall (23), thus penetrating and removing an oxide surface of said wall.

* * * * *